United States Patent [19]

Lowry et al.

[11] 4,428,183
[45] Jan. 31, 1984

[54] CARRIAGE FOR A GRASS TRIMMING DEVICE

[76] Inventors: Joseph M. Lowry, 308 Sweetbriar Dr.; Ernest E. Griffin, 12306 Ridgefield Pkwy., both of Richmond, Va. 23233

[21] Appl. No.: 296,003

[22] Filed: Aug. 25, 1981

Related U.S. Application Data

[63] Continuation-in-part of Ser. No. 119,176, Feb. 6, 1980, Pat. No. 4,287,709.

[51] Int. Cl.³ .................... A01D 35/12; A01D 67/00
[52] U.S. Cl. .................................... 56/17.2; 56/320.1
[58] Field of Search ............... 56/17.2, 17.5, 208, 56/12.7, 10.5, 255, 256, 249, 320.1, 320.2; 248/672, 678, 680, 681

[56] References Cited

U.S. PATENT DOCUMENTS

| | | | |
|---|---|---|---|
| 2,568,822 | 9/1951 | Pervis | 56/17.2 |
| 2,796,715 | 6/1957 | Meltzer | 56/255 |
| 3,093,947 | 6/1963 | Whitman | 56/255 |
| 3,699,752 | 10/1972 | Dandl | 56/320.1 |
| 3,757,500 | 9/1973 | Averitt | 56/17.2 |
| 4,112,656 | 9/1978 | Ranko et al. | 56/320.1 |

FOREIGN PATENT DOCUMENTS

| | | | |
|---|---|---|---|
| 230276 | 10/1959 | Australia | 56/16.9 |
| 222822 | 5/1958 | Australia | 56/17.2 |
| 7623645 | 2/1978 | France | 56/17.2 |

*Primary Examiner*—Gene Mancene
*Assistant Examiner*—James Hakomaki
*Attorney, Agent, or Firm*—Cushman, Darby & Cushman

[57] ABSTRACT

Carriage for grass trimming device of the type having a rotating cutting element in the form of a length of cord comprises a platform and mounting wheels for moving platform over ground, front wheels being telescopically mounted for extension in a longitudinal and transverse direction, front and rear wheels having eccentric axles so that the carriage height above the ground can be varied, and a clamping structure including a retaining arm having engageable ends for engaging with pivotable clamps for securely and releasably holding the trimming device on the carriage.

11 Claims, 15 Drawing Figures

CARRIAGE FOR A GRASS TRIMMING DEVICE

RELATED APPLICATIONS

This is a continuation-in-part application of Ser. No. 119,176, filed Feb. 6, 1980 now U.S. Pat. No. 4,287,709.

BACKGROUND AND BRIEF DESCRIPTION OF THE INVENTION

The present invention relates to a carriage having wheels and a handle and an aperture for engaging and retaining a grass or weed cutting device of the type utilizing a cable rotated by a motor output to cut grass, weeds or the like close to objects that cannot be cut by the conventional power or hand mower.

For some years now, trimming devices in the form of rapidly rotated cables of nylon or the like have been employed to manicure lawns and cut weeds around objects that cannot be cut by a conventional lawnmower due to the inability of the mower to closely approach such objects as fences, trees, walls or the like. Such devices have been very popular since they have eliminated the task of operating hand clippers to trim the edges of lawns around objects such as those enumerated above.

However, in a number of circumstances, the weight of such devices has proved to be an impediment to their use and the fact that the devices have been designed to be hand held has also limited their application to a number of trimming jobs such as under large trees and bushes having extensively overhanging foliage, or under fixedly mounted lawn furniture. For long periods of operating time, the devices can be a considerable burden to handle due to their weight and due to the fact that care must be taken to maintain the electric cord in a safe position. Also, where the devices are gas operated, the weight of the motor and fuel can be a critical factor contributing to early fatigue for the user. Thus, where trimming devices of either the electrical or combustion engine driven type have been employed for working on estates, public parks or the like, worker fatigue will be a significant problem which will inevitably reduce efficiency. Additionally, use of these hand held type trimmers on certain landscapes can be dangerous such as where the terrain is very steep and where it is difficult for the operator of such a device to maintain a balanced foothold.

The present invention overcomes the foregoing disadvantages by providing a wheeled carriage for the electrical or gas driven trimming devices wherein such a device can be easily mounted and dismounted from the carriage and yet can be securely held on the carriage to greatly extend the working period by lessening worker fatigue. Further, use of the carriage of the present invention will enable an operator to cut grass and weeds in locations that have previously been inaccessible for hand held operation such as under trees with low hanging boughs, porches or lawn furniture or the like. Additionally, the carriage of the present invention is provided with a telescoping handle so that an operator will be able to cut or trim edge sections located on steep banks while being able to stand at a distance from the cutting site.

In summary, the carriage of the present invention is designed for cooperation with electrically driven or gas driven trimming devices of the type where a section of cord extends from a motor output and which is rotated at high speeds about a central axis of the motor. Conventionally, such devices have a skirt portion extending from the motor housing with the motor located above the skirt portion and the cutting cord located below the skirt. The carriage of the present invention includes a platform having a cental aperture into which the skirt portion can be fitted and held by releasable retaining arms so that the trimming device can be easily inserted and removed from the carriage without difficulty as may be frequently required during a grass trimming operation. The releasable retaining arms cooperate with the aperture in a unique manner to securely hold the motor housing in position on the carriage while providing easy removal of the cutting device from the carriage. Also, the present invention provides a fifth wheel for the carriage to permit the platform of the carriage to be tilted to the horizontal to facilitate trimming along the edge of a lawn thereby avoiding the tiresome necessity of holding the cutting device entirely by hand at an angle to the edge to be trimmed.

Other features and advantages of the present invention will become apparent as consideration is given to the accompanying detailed description taken in conjunction with the accompanying drawings, in which:

DETAILED DESCRIPTION OF THE INVENTION

Figure 1:
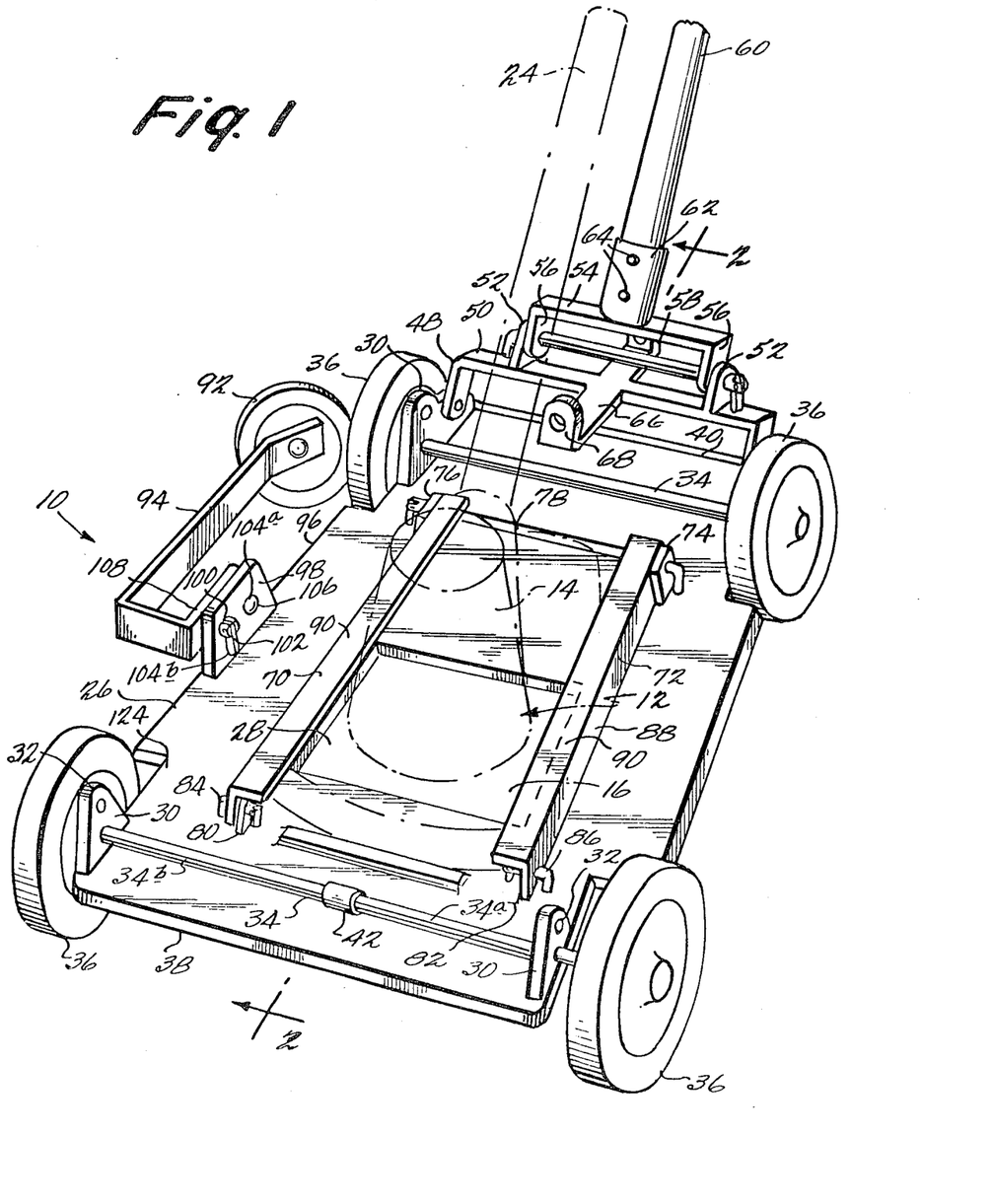
FIG. 1 is a perspective view of the carriage of the present invention showing, in phantom lines, a grass trimming device mounted on the carriage.

Referring now to the drawings, there is shown in FIG. 1 the carriage 10 of the present invention on which is supported a conventional grass trimming device shown in phantom lines at 12. The carriage of the present invention is designed to cooperate with a grass trimming device 12 which is of the type having a motor housing 14 which extends upwardly from a peripheral skirt portion 16. As shown more clearly in FIG. 2, protruding from the bottom of the housing 14 is a circular rotor 18 to which is attached, interiorly thereof, a plastic cord 20 which is the cutting element of the trimming device 12. In operation, wherein an electric motor is enclosed within a housing 14, a rotor 18 is fixed to the output of the motor to rotate about the central axis of the motor at high speed so as to carry the cord 20 with it in a circular motion as is well known.

Power for the motor in the housing 14 is provided through an electric cord which extends through a handle mount 22 and handle pole 24.

Accordig to the present invention, a rigid platform 26 is provided with a substantially centrally located aperture 28 through which the rotor 18 and cord 20 are inserted when the trimming device 12 is mounted on the carriage 10.

The platform 26 is generally rectangular in plan view and has four wheel mounting posts 30 at each of its corners. Each of the posts may have a plurality of apertures such as at 32 for receiving axle rods 34 on the outer ends of which wheels 36 are releasably mounted in a conventional manner. With this arrangement, the vertical height of the platform 26 above the ground can be adjusted in a number of ways. For example, the front edge 38 of the carriage 10 may be lowered relative to its rear edge 40 by passing the front axle rod 34 through the lower set of apertures 32 while the rear axle rod is inserted through the upper pair of apertures in the rear posts 30. Of course, while only two sets of apertures are illustrated for the front and rear edges, it will be understood that a plurality of apertures can be supplied to greatly vary the inclination of the platform 26 with respect to the horizontal.

The axle 34 adjacent the front edge 38 may be of a telescoping type so that by loosening nut 42 the inner rod 34a may be slid out from the outer rod 34b to space the front wheels 36 outwardly from the platform 26 to eliminate any possibility of interference with the cutting operation of the cord 20.

Figure 2:
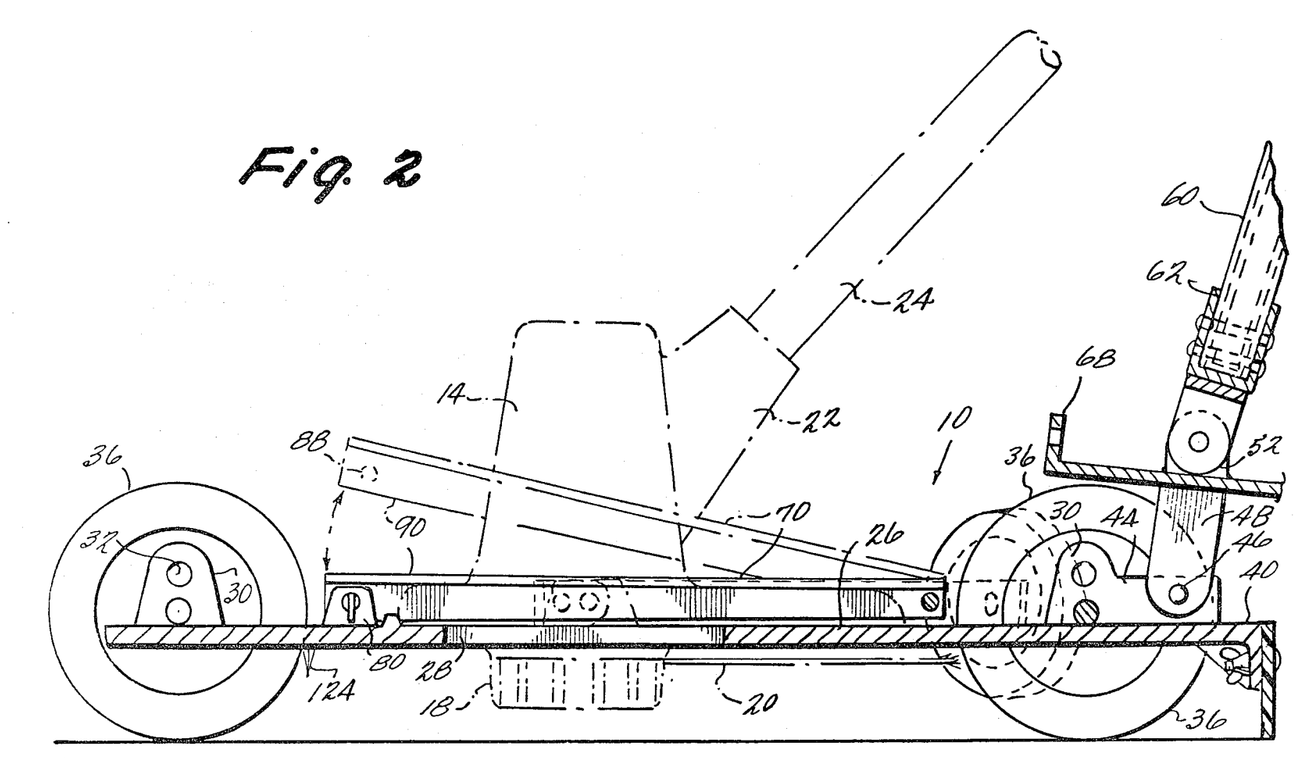
FIG. 2 is a view along line 2—2 of FIG. 1.

Each of the rear wheel posts 30 have rearwardly extending walls 44 as shown more clearly in FIG. 2, each of which have aligned apertures for receiving pins 46 for pivotally supporting ends of a handle mount 48. The handle mount 48 has a cross bar 50 on which are mounted spaced apart apertured ears 52. A handle yoke 54 is provided which has downturned apertured ears 56 which are mounted on a pin 58 which extends through the apertures for ears 56 and 52 to mount the yoke 54 on the crossbar 50. A telescoping handle rod 60 is mounted in the hollow cylindrical well 62 which is securely attached as by riveting or is integrally made with the yoke 54. Pins 64 securely hold the end of the telescoping handle rod 60 in the well 62 but, of course, other means such as a threaded connection may be employed. At its free end, the rod 60 has a handle (not shown).

The crossbar 50 is provided at its midpoint with a cross-extension 66 which has, at its opposite ends, upturned apertured ears 68. With this arrangement, removable pin 58 can be employed to mount the yoke 54 for pivotal movement on cross-extension 66 when the platform 26 is to be operated at an angle to the horizontal, as will be explained in more detail hereinafter.

In order to hold the trimming device 12 securely on platform 26, according to the present invention, there are provided retaining arms 70, 72 each of which has one end pivotally mounted on the platform 26. Specifically, the platform 26 is provided with a pair of perpendicularly extending ears, on one side of the aperture 28 and one at 76 on the opposite side of the aperture 28. Each retaining arm 70 and 72 is also apertured and a pivot rod 78 is releasably inserted through the respective apertures of the ears and retaining arms as illustrated in FIG. 1 whereby the retaining arms are pivotable about an axis that lies parallel to the surface of the platform 26. On the side of the aperture 28 opposite the position of the ears 74 and 76, there are provided a corresponding set of apertured ears 80 and 82. The opposite ends of the retaining arms 70 and 72 are similarly apertured to receive retaining pins 84 and 86.

In this embodiment, each of the retaining arms 70 and 72 is L-shaped in cross-section with a wall 88 disposed to extend substantially perpendicular to the surface of the platform 26 when the retaining arm is in its closed position and a wall section 90 which will be disposed to extend parallel to the surface of the platform 26 when the respective arm is in its closed position. With this arrangement, when the retaining arms are closed and locked, the walls 88 will restrain the trimming device 12 from horizontal movement and the wall 90 will prevent vertical movement since these wall sections will engage the upper portion and side portion of the skirt 16 of the trimming device 12.

Figure 3:
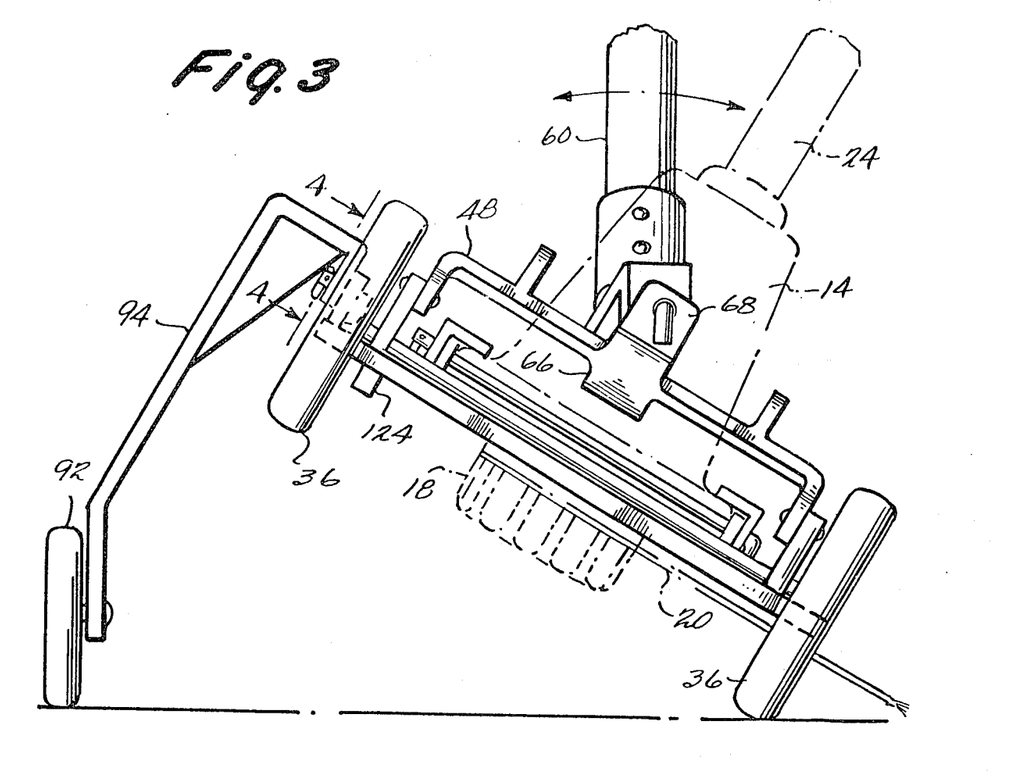
FIG. 3 is a front view in elevation showing the fifth wheel in its operating position.
Figures 4, 5:
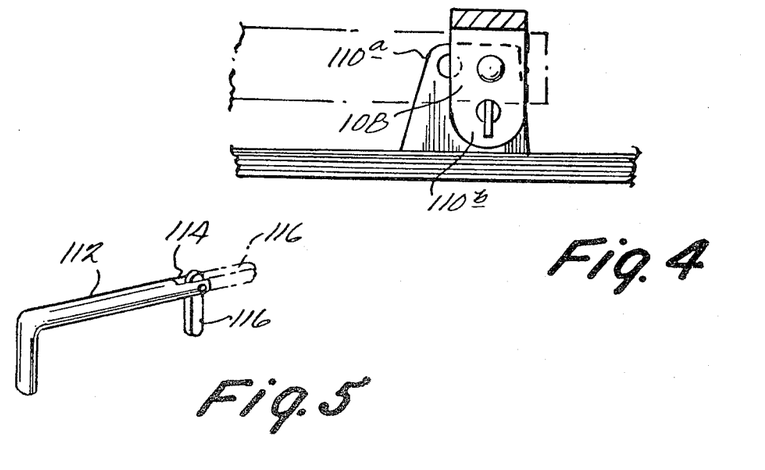
FIG. 4 is a detailed view of the mounting member for the support arm of the fifth wheel.
FIG. 5 is a perspective view of a link rod.

It frequently happens that, along a path or driveway, the grass or weeds will extend generally horizontally close to the surface of the path or driveway, thus rendering it difficult to cut the growth while holding the trimming device with the axis of the motor perpendicular to the ground. In such situations, it is desirable to tilt the trimming device so that the cord 20 will cut down on the grass or weeds and, to this end, the present invention provides a fifth wheel 92 which is rotatably mounted on the end of a pivoting leg member 94 which can be moved from a stored position as shown in FIG. 1 to an extended position as shown in FIG. 3. To this end, side edge 96 of platform 26 is provided with a vertically extending ear 98 which is provided with a first aperture 100 through which a releasable pivot pin 102 is disposed to allow pivotal movement of the arm 94 thereon and two positioning apertures 104a and 104b for receiving a locking bolt 106. The attaching end 108 of leg 94 is provided with two spaced apertures as shown in FIG. 4 at 110a and 110b. With this arrangement, the leg member 94 can be rotated about pin 102 to align aperture 110b with either aperture 104a or 104b to permit locking of the leg 94 in either the retracted or extended position.

When the platform 26 is tilted as shown in FIG. 3, the telescoping handle rod 60 is attached to cross-extension 66 of the handle mount 48 as shown in FIG. 3 to facilitate guiding the carriage 10 in the tilted position.

As shown in FIG. 5, a useful structure for the pivot pin 102 as well as the retaining pins 84 and 86 is shown in the form of a bent rod 112 which has a split end 114 in which is carried a pivotable toggle 116 to facilitate insertion through the respective apertures when in the phantom line position of FIG. 5 and yet which will securely retain its associated elements when in the solid line position of FIG. 5.

Figure 6:
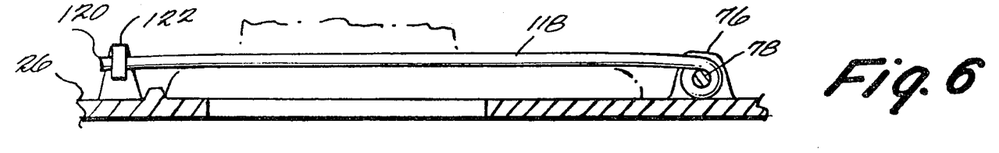
FIG. 6 is a detailed view of another embodiment of the retaining arms of the present invention.

Another embodiment of the retaining arms 70 and 72 is shown in FIG. 6. In this embodiment, a metal rod 118 has one end pivotally mounted on rod 78 while its opposite end 120 is captured in the neck of a downwardly opening hook 122 located in the place of ear 80. An identical arrangement is provided for the other retaining arm and will therefore not be described. With this arrangement, the rods having a small degree of flexibility can accommodate a wider variation in dimensions in the skirt portion 16 of the grass trimming devices 12 and yet will securely hold the skirt portion on the platform 26.

If desired, the aperture 28 on platform 26 can be elongated to permit shifting of the grass trimming device relative to the front and side edges of the platform 26. This will enable a user to vary the cutting pattern since the length of cord 20 on many of these types of grass trimming devices can be varied by a simple adjustment. However, where an operator has extended too great a length of cord 20, the underside of platform 26 is provided with a knife edge 124 which may preferably be located immediately behind the front wheels 36 adjacent one side edge of the platform 26 so as to define the appropriate radius of the cutting cord 20.

Figure 7:
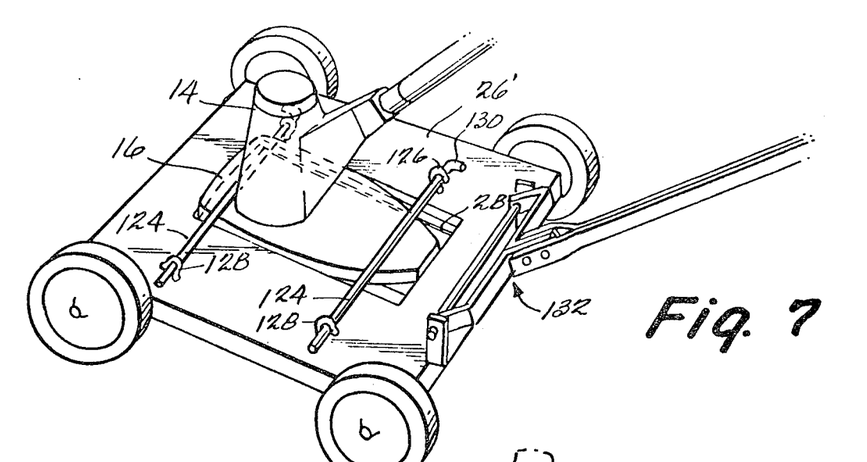
FIG. 7 is a perspective view of an embodiment similar to that of FIG. 6 showing the disposition of both arms.

In FIG. 7, there is shown another embodiment similar to that of FIG. 6 but where the retaining arms in the form of rods 124 extend transversely to a platform 26'. In this embodiment, one end of each of the rods 124 is pivotally retained in eyelet 126 while the other ends of each of the rods are releasably retained in oppositely facing hooks 128 which have their opening facing downwardly towards the platform 26'. The retaining rods 124 extend across the skirt 16 of the grass trimming device 14. The ends of the rods passing through the eyelets 126 may be bent as at 130 to retain the rods in the eyelets 126. Preferably, the skirt 16 will project upwardly from the platform 26' a sufficient distance so that the retaining arms 124 will have to be bent slightly when their free ends are held in the hooks 128 to thereby provide a firm yet resilient retention of the trimming device in the aperture 28.

The platform 26' of FIG. 7 may also have the fifth wheel arrangement illustrated in the above described embodiments of FIGS. 1-5 as well as the same telescoping rod mounting arrangement, although the simplified handle mount of FIG. 7 as shown at 132 may also be employed to reduce the overall manufacturing cost of the device.

Figures 8, 9:
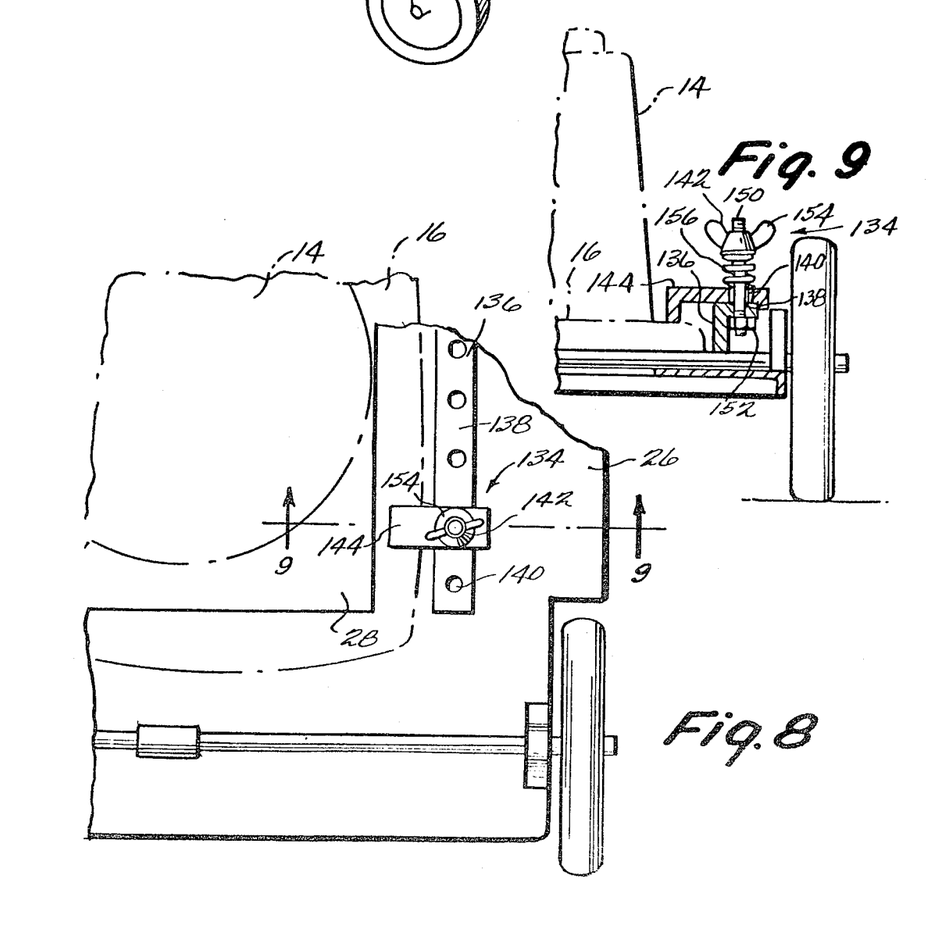
FIG. 8 is a partial top plan view showing yet another embodiment.
FIG. 9 is a view along lines 9—9 of FIG. 8.

As shown in FIGS. 8 and 9, another embodiment of the retaining arms of the present invention is illustrated at 134. In this embodiment, a right angle flanged bar 136 is secured to or made integral with the platform 26 and extends upwardly therefrom and is provided with a flange 138 which extends parallel to the surface of the platform 26. The flange 138 may be provided with a plurality of apertures such as at 140 to receive the clamping means 142. As shown in FIG. 9, the clamping means comprises a retaining arm 144 which has a downturned flange 146 at one end thereof for engaging the topside of the skirt 16 of the grass trimming device 14. The other end of the retaining arm 144 has an aperture 148 through which a threaded bolt 150 is disposed. At one end of the bolt 150 a nut 152 is secured while at the other end a wing nut 154 is provided. A coil spring 156 is inserted over the bolt 150 between the wing nut 142 and the retaining arm 144. With this arrangement, tightening of the wing nut 142 while holding the nut 152 stationary will provide a resilient retention of the retaining arm 144 against the skirt 16 while loosening of the wing nut 142 will permit pivoting movement of the retaining arm 144 out of the way of the skirt to facilitate removal of the grass trimming device from the platform 26. A plurality of clamping means 142 will be provided for attachment to the bar 136 on either side of the skirt 16 to provide firm but resilient attachment of the skirt to the platform 26. For very light models of grass trimming devices 14, it should be possible to hold the skirt firmly in the aperture 28 with a pair of clamping means, one located on each side of the motor.

The main body of the carriage 10 may be made of metal, wood or high impact plastic with the axles and pivot pins being made of metal rod material. While the embodiments shown in the drawings illustrate the retaining arms as extending from the rear towards the front edge of the plaform 26, it will be understood that the present invention also contemplates extending the retaining arms from one side edge to the other as this can be easily accomplished to provide the same secure mounting for presently available grass trimming devices.

Referring now to FIGS. 10-15 wherein additional embodiments according to the present invention are depicted, it will be seen that the carriage platform 10 of these embodiments similarly supports a conventional grass trimming device (shown in phantom lines at 102 in FIG. 10) and includes a pivotal handle 132. The embodiment depicted more clearly in FIGS. 10 and 11, however, provides for an extension, both logitudinally and transversely, of the front pair of wheels 104.

Figure 10:
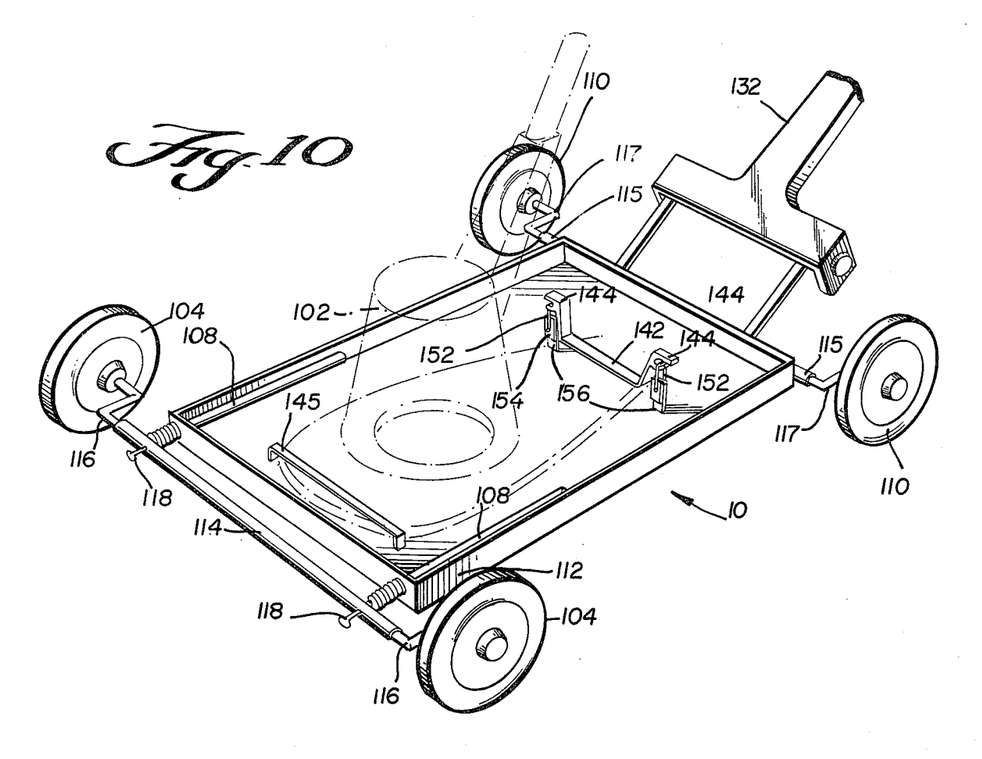
FIG. 10 is a perspective view of another embodiment of the carriage of the present invention showing, in phantom lines, a grass trimming device mounted thereto.

The longitudinal extension of the front pair of wheels 104 is accomplished by preferably providing mating tubular members 106, 108. The mating tubular members 106, 108 interact so that a sliding and telescoping action can be effected to longitudinally increase or decrease the distance between the front pair of wheels 104 and the rear pair of wheels 110. As can be more clearly seen in FIG. 11, the tubular members 106, 108 preferably have a set screw 112 associated therewith so that the front edge member 114 of the carriage platform 10 can be securely yet releasably extended to a predetermined position. However, should the operator desire to return the front edge member 114 of the carriage platform 10 to the retracted position as depicted in FIG. 10, the set screw 112 could be loosened thereby permitting sliding movement of each of the mating members 106, 108. In such a manner, the longitudinal spatial distance between the front pair of wheels 104 and the rear pair of wheels 110 can be selectively controlled so that the cutting element 20 when rotating beneath the carriage platform 10 will not contact and damage the front wheels 104.

Due to the environment in which the present invention will operate protection sleeves 113 are provided around mating member 106. In such a manner, sleeves 113 protect the sliding surfaces of member 106 from contamination by cut vegetation, soil or the like.

Figure 11:
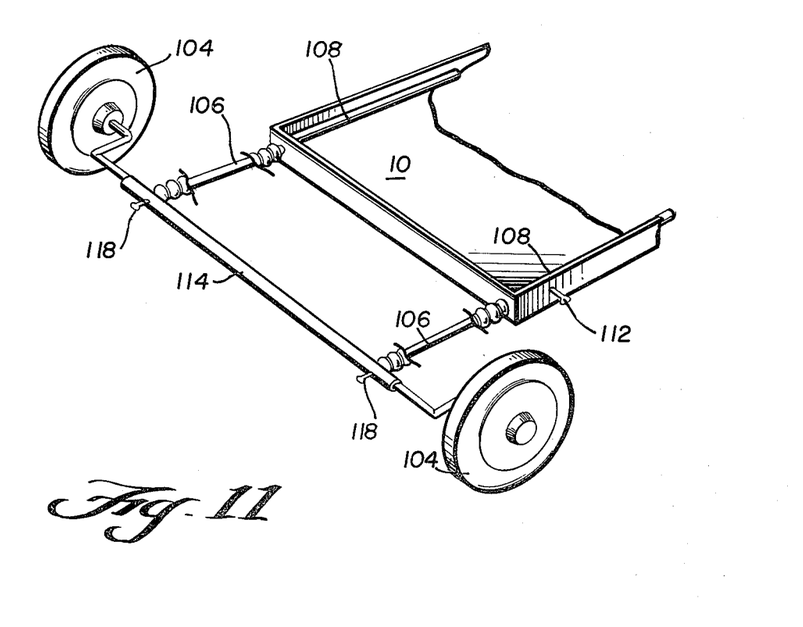
FIG. 11 is a detailed perspective view of the front portion of the embodiment depicted in FIG. 10.

Referring more specifically to FIG. 11, the front wheels 104 can also be extended between a narrow and wide position transverse of the platform 10. The transverse adjustment of the front wheels 104 is accomplished by utilizing mating axles and front edge members, 116 and 114, respectively so that sliding and telescoping transverse action can be effected. Similarly, a set screw 118 can be utilized to securely position the front wheel 104 between a narrow and a wide position. It should be appreciated that both front wheels 104 do not necessarily need to be mounted for transverse extension. One, or both front wheels can be mounted for transverse extension according to this embodiment depending upon the degree of platform stability that is desired.

Figure 12:
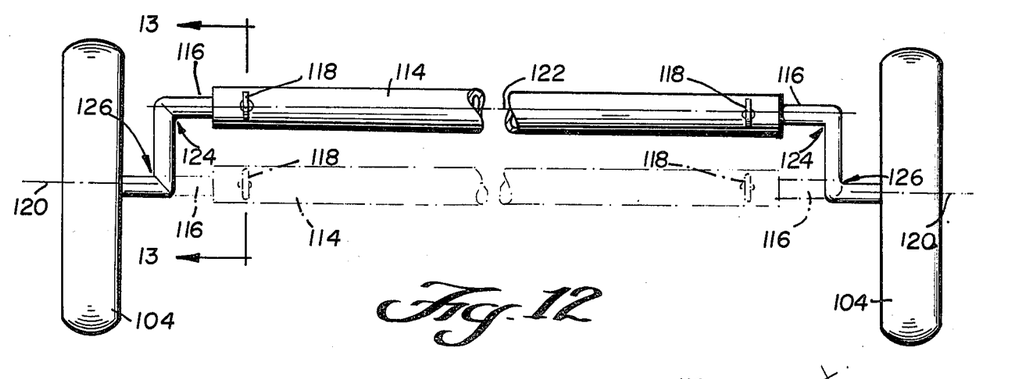
FIG. 12 is a front elevational view of the axle mounting of the embodiment depicted in FIG. 10.

The wheels 104, 110 of the carriage 10 according to the present invention can be mounted in such a manner that the distance that the platform is disposed vertically above the ground can be controlled. Referring more specifically to FIG. 12, a wheel mounting arrangement is depicted wherein an eccentric front axle 116 is utilized. The arrangement depicted in FIG. 12 is shown for front wheels 104 only, however, the reader should appreciate that the rear wheels 110 can be mounted in a similar manner (e.g. rear axles 117 can be eccentric and pivotable in rear edge member 115 between at least two positions). The eccentric axle 116 generally provides for an offset between the rolling axis 120 of the wheels 104 and the rotating axis 122 of the axle 116. The eccentric axle 116 is preferably maintained in position by set screws 118 and, accordingly, when it is desired to vary the distance that the platform is disposed above the ground, the set screws 118 can be loosened and the axle 116 rotated to a lower position (noted in phantom lines in FIG. 12). The eccentric axle 116 preferably has two bends 124, 126 intermediate the front edge member 114 of the platform 10 and the wheel 104 which is mounted adjacent thereto. The bends 124, 126 are coplanar such that front wheels 104 rest upon the surface of the ground at a normal rolling relationship.

Figures 13, 14, 15:
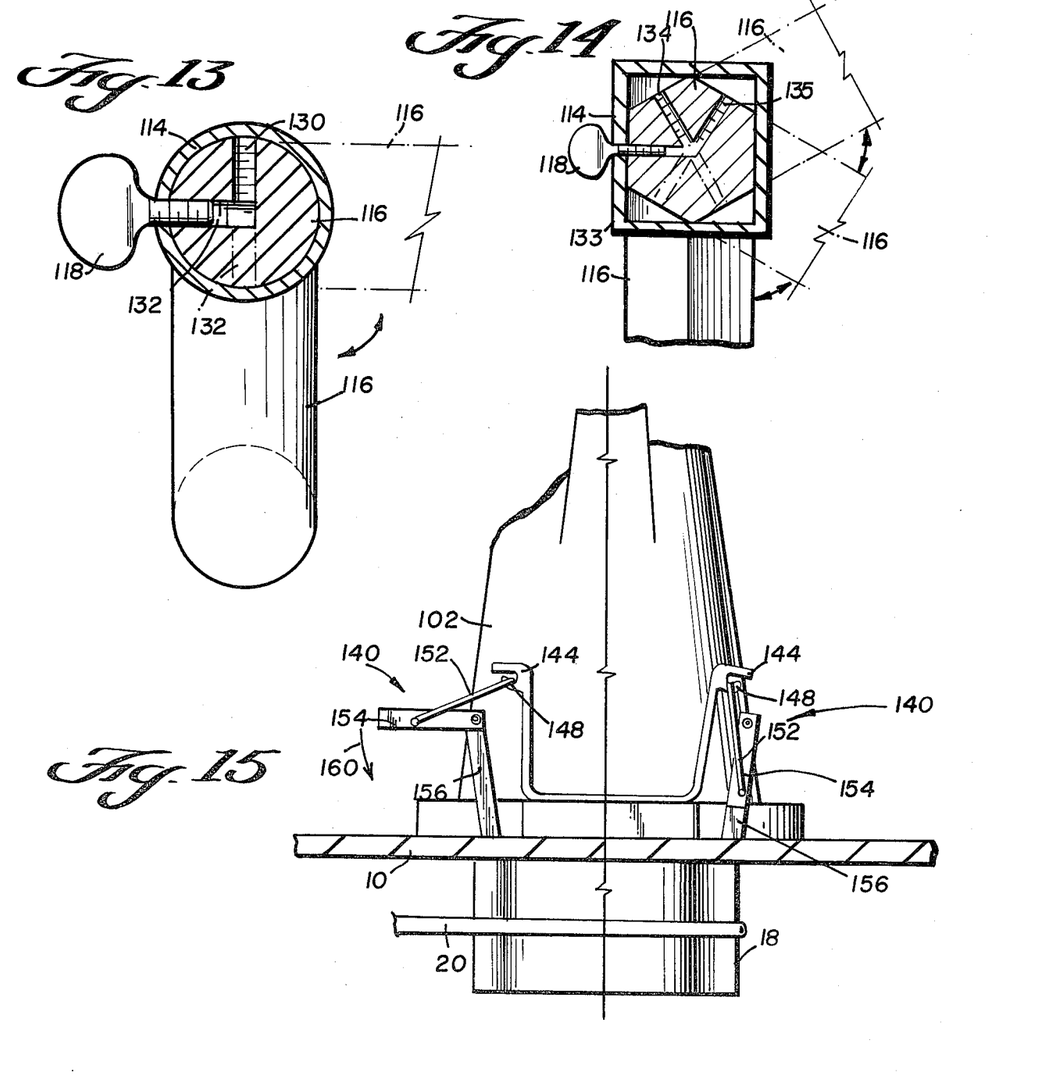
FIG. 13 is a sectional view along lines 13—13 of FIG. 12.
FIG. 14 is a sectional view of another embodiment of the wheel axle mountings according to the present invention.
FIG. 15 is a detailed view of another embodiment of the retaining assembly of the present invention.

Referring more specifically to FIG. 13 wherein a detailed cross-sectional view of the eccentric axle 116 is depicted, it is seen that the front edge member 114 acts as a sleeve around the axle 116 so that it may rotate therein between at least two set positions. The high position is noted in solid lines in FIG. 13, while the low position is noted in phantom lines therein. The set screw 118 preferably cooperates with threaded cavities 130, 132 tapped into axle 116. In such a manner, the axle can be provided with at least two positions, a high position and a low position. Additionally, while only two positions are depicted in the drawings, it should be appreciated by the reader that a plurality of positions intermediate a high and low position can be provided depending upon the number and location of threaded cavities provided.

Another embodiment of the axle 116 mounting can be more clearly seen referring to the cross-sectional view thereof depicted in FIG. 14. Again, while only axle 116 is depicted, it should be appreciated by the reader that rear wheels 110 and rear axles 117 can be mounted in a similar manner. The embodiment depicted in FIG. 14 is similar to the embodiment depicted in FIG. 13 in that a plurality of wheel positions can be provided. According to the embodiment of FIG. 14, however, front edge member 114 is shaped such that its interior surfaces generally define a square cavity. The portion of axle 116 which is enclosed by edge member 114 can also be square shaped or, preferably, hexagonally shaped.

The hexagonal shape of the enclosed portion of axle 116 is preferable since three wheel positions can be provided by including three threaded cavities 133, 134 and 135, respectively corresponding to a high medium and low position of wheels 104. Thus, a preterminal wheel position can be selected by aligning the desired threaded cavity for cooperation with set screw 118. Additionally, the hexagonal shape is preferable since the flat surfaces thereof will resist any torque transmitted to the axle thereby prolonging the useful life of set screw 118. The coplanar bends 124, 126 can be provided on axle 116 in the same manner as discussed above.

The embodiment depicted in FIG. 10 utilizes a simplified structure for securely yet removably attaching the cutting device to the carriage 10 according to the present invention. As can be more clearly seen in FIG. 14, the retaining structure 140 generally comprises a retaining arm 142 having engaging ends 144. The retaining arm 142 preferably is positioned transversely above and across the housing of the cutting device in such a manner that it is juxtaposed thereto. Additionally, a flange member 145 can be provided which is fixedly attached to carriage platform 10 so that the front portion of cutting device 102 can be positioned underneath and, together with retaining structures 140, provide secure attachment.

The left-hand portion of FIG. 15 depicts the retaining structure 140 of the present embodiment in a released position, while the right-hand portion thereof depicts the retaining structure 140 in an engaged position. The engagement ends 144 of the retaining structures 140 preferably include lip portions 148 such that the engaging portion 152 of the retaining structure 140 can operatively associate therewith. The engaging portion 152 is hinged to one end of the clamp body 154 and at the opposite end of the clamp body 154, a support member 156 is hinged thereto. The support member is fixedly attached to and extends above carriage platform 10.

In such a manner, when the engaging portion 152 of the clamp engages the associated engagement end 144 of the retaining arm 142, and the clamp body 154 is forced to pivot in a downward direction (noted by arrow 160 in FIG. 15), a biasing action is effected upon the retaining arm 142 thereby securely holding the cutting device 102 in place. The retaining structure 140 is shown in its fully engaged position in the right-hand portion of FIG. 14. When the retaining structure 140 is desired to be moved to its disengaged position, the body member will simply need to be rotated in an upward direction (e.g. in a direction opposite to arrow 160) thereby releasing the downward bias and effecting disengagement of the engaging portion 152 with its associated engagement end 144 of the retaining arm 142.

Having described the invention, it will be apparent to those skilled in this art that various modifications may be made therein without departing from the spirit and scope of the present invention as defined in the appended claims.

What is claimed is:

1. A carriage for a trimming device of the type having a motor, a housing for the motor, a cutting element in the form of a length of cable connected to said motor so as to be rotatable about an axis at high speed for cutting vegetation, said carriage comprising:

a platform having top and bottom surfaces defining an aperture for receiving and supporting a motor driven trimming device, a front edge, a rear edge, and opposite side edges extending between said front and rear edges, and means for supporting said platform for movement over ground including a front pair of wheels rotatably mounted adjacent said front edge and a rear pair of wheels rotatably mounted adjacent said rear edge thereby defining a predetermined longitudinal distance between said front and rear pairs of wheels whereby said bottom surface is supported above said ground a predetermined distance so as to define a space in which said cutting element rotates;

releasable retaining means mounted on said top surface of said platform for securely holding said cutting device in said aperture with said cutting element disposed to extend below said bottom surface and said ground, said retaining means including a retaining member having first and second engaging ends, said retaining member adapted to be transversely positioned above and across a portion of said housing so as to be in contact therewith when said trimming device is operatively positioned upon said platform, and first and second clamping means for respective clamping engagement with said first and second engaging ends, each of said clamping means including a support member rigidly attached to and extending above said top surface, means for engaging said engagement end of said retaining member associated therewith, and a body member pivotably attached to said support member at one end and said engaging means at the opposite end so that said body member can be pivotable to allow said engagement means to engage said engagement end associated therewith and thereafter to be pivotable to an engaged position thereby effecting a bias force of said retaining member upon said cutting device to securely hold it in place upon said platform, and wherein said platform supporting means further includes first means for longitudinally and telescopically adjusting said front edge and said front pair of wheels rotatably mounted adjacent thereto between a retracted position and an extended position thereby effecting a longitudinal variance in the distance between said front and rear pairs of wheels.

2. A carriage as in claim 1 wherein said platform supporting means further includes second means for transversely and telescopically adjusting at least one wheel of said front pair of wheels between a narrow position and a wide position so that the distance between each wheel of said front pair of wheels can be varied a predetermined amount.

3. A carriage as in claims 1 or 2 wherein said front edge includes eccentric front axles for rotatably mounting said front wheels thereto, and said rear edge includes eccentric rear axles for rotatably mounting said rear wheels adjacent thereto, means for selectably positioning said front and rear axles between high and low positions thereof so that a rotation of said front and rear axles produces a camming effect upon said platform due to the eccentric nature of said front and rear axles to selectably raise or lower said platform relative to the ground thereby varying the cutting depth of said rotating cutting element.

4. A carriage as in claim 3 wherein said eccentric front axle includes between said front edge and each of said front wheels mounted adjacent thereto at least two coplanar bends to effect mounting of each of said front wheels so that the rolling axis of said front pair of wheels is offset from and parallel to the rotating axis of said front axle, and wherein said eccentric rear axle includes between said rear edge and each of said rear wheels mounted adjacent thereto at least two coplanar bends to effect mounting of each of said rear wheels so that the rolling axis of said rear pair of wheels is offset from and parallel to the rotating axis of said rear axle.

5. A carriage as in claim 3 wherein said selectable positioning means includes front and rear edge portions each having surfaces defining an elongated square cavity, and means located on a portion of said front and rear axles defining a plurality of elongated generally flat surfaces predetermined ones being in contact with corresponding surfaces of said square cavity so that said predetermined ones of said flat surfaces in contact with said corresponding square cavity surfaces determines the position of said wheels with respect to said carriage.

6. A carriage as in claim 5 wherein said generally flat surface defining means is hexagonally shaped.

7. A carriage for a trimming device of the type having a motor, a housing for the motor, a cutting element in the form of a length of cable connected to said motor so as to be rotatable about an axis at high speed for cutting vegetation, said carriage comprising, a platform having top and bottom surfaces defining an aperture for receiving and supporting a motor drive trimming device, a front edge, a rear edge, and opposite side edges extending between said front and rear edges;

means for supporting said platform for movement over ground including eccentric front axles and a front pair of wheels rotatably mounted to said front axle adjacent said front edge, eccentric rear axles and a rear pair of wheels rotatably mounted to said rear axle adjacent said rear edge, means for selectably positioning said front and rear axles between high and low positions thereof so that rotation of said front and rear axles produces a camming effect upon said platform due to the eccentric nature of said front and rear axles to selectably raise and lower said platform relative to the ground thereby varying the cutting depth of said rotating cutting element, said supporting means further including first means for longitudinally and telescopically adjusting said front edge and said front pair of wheels rotatably mounted adjacent thereto between a retracted position and an extended position thereby effecting a longitudinal variance of the distance between said front and rear pairs of wheels, and second means for transversely and telescopically adjusting at least one wheel of said front pair of wheels between a narrow position and a wide position so that the distance between each wheel of said front pair of wheels can be varied a predetermined amount; and releasable retaining means mounted on said top surface of said platform for securely holding said cutting device in said aperture with said cutting element disposed to extend below said bottom surface so as to be rotatable in said space defined between said bottom surface and said ground, said retaining means including a retaining member having first and second engaging ends, said retaining member adapted to be transversely positioned above and across a portion of said housing so as to be in contact therewith when said cutting device is operatively positioned upon said platform, and first and second clamping means for respective clamping engagement with said first and second engaging ends, each of said first and second clamping means including a support member rigidly attached to and extending above said top surface, means for engaging said engaging end of said retaining member associated therewith, and a body member pivotably attached to said support member at one end and said engaging means at the opposite end so that said body member can be pivotable to allow said engagement means to engage said engagement end associated therewith and thereafter to be pivotable to an engaged position thereby effecting a bias force of said retaining member upon said cutting device to securely hold it in place upon said platform.

8. A carriage as in claim 7 wherein said eccentric front axle includes between said front edge and each of said front wheels mounted adjacent thereto at least two coplanar bends to effect mounting of each of said front wheels so that the rolling axis of said front pair of wheels is offset from and parallel to the rotating axis of said front axles, and wherein said eccentric rear axle includes between said rear edge and each of said rear wheels mounted adjacent thereto at least two coplanar bends to effect mounting of each of said rear wheels so that the rolling axis of said rear pair of wheels is offset from and parallel to the rotating axis of said rear axle.

9. A carriage as in claims 7 or 8 wherein said selectable positioning means include front and rear edge portions each having surfaces defining an elongated square cavity, and means located on a portion of said front and rear axles defining a plurality of elongated generally flat surfaces predetermined ones of said flat surfaces in contact with said corresponding square cavity surfaces determine the position of said wheels with respect to said carriage.

10. A carriage as in claim 9 wherein said generally flat surface defining means is hexagonally shaped.

11. A carriage as in claims 1 or 7 wherein said first means includes compressible sleeve means for protecting said first means against contaminating materials.

* * * * *